(12) United States Patent
Chong et al.

(10) Patent No.: US 12,323,305 B2
(45) Date of Patent: Jun. 3, 2025

(54) POLICY DETERMINING METHOD AND APPARATUS

(71) Applicant: HUAWEI TECHNOLOGIES CO., LTD., Shenzhen (CN)

(72) Inventors: Weiwei Chong, Shenzhen (CN); Yang Xin, Shanghai (CN); Xiaobo Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/494,512

(22) Filed: Oct. 25, 2023

(65) Prior Publication Data

US 2024/0064066 A1 Feb. 22, 2024

Related U.S. Application Data

(63) Continuation of application No. PCT/CN2021/089783, filed on Apr. 26, 2021.

(51) Int. Cl.
*H04L 41/16* (2022.01)
*H04L 41/14* (2022.01)
*H04L 41/5067* (2022.01)

(52) U.S. Cl.
CPC ............ *H04L 41/16* (2013.01); *H04L 41/14* (2013.01); *H04L 41/5067* (2013.01)

(58) Field of Classification Search
CPC ...... H04L 41/16; H04L 41/14; H04L 41/5067
See application file for complete search history.

(56) References Cited

U.S. PATENT DOCUMENTS

| 9,621,579 | B2* | 4/2017 | Casaburi | H04L 63/145 |
| 2019/0250857 | A1* | 8/2019 | Reddy | G06F 12/0895 |
| 2020/0382968 | A1* | 12/2020 | Gupta | H04L 41/145 |

(Continued)

FOREIGN PATENT DOCUMENTS

| CN | 112543170 A | 3/2021 | | |
| WO | WO-2018160121 A1 * | 9/2018 | ............ | G06F 13/36 |

(Continued)

OTHER PUBLICATIONS

"3rd Generation Partnership Project; Technical Specification Group Services and System Aspects; Study on enablers for network automation for the 5G System (5GS); Phase 2 (Release 17)," 3GPP TR 23.700-91 V17.0.0, XP051975177, total 382 pages, 3rd Generation Partnership Project, Valbonne, France (Dec. 2020).

*Primary Examiner* — Philip C Lee
(74) *Attorney, Agent, or Firm* — Leydig, Voit & Mayer, Ltd.

(57) ABSTRACT

A policy determining method is disclosed, and includes: obtaining, based on a digital twin entity, first data and a label corresponding to the first data; and training, based on the first data and the label corresponding to the first data, to obtain an artificial intelligence AI model. The AI model is configured to obtain an air interface access policy and/or a user plane path selection policy of a plurality of terminal devices in a network or in an area. This helps resolve a problem of the air interface access policy and user plane path selection of the plurality of terminal devices in the network or in the area. This can further ensure that network energy consumption is the lowest when overall average service experience of the terminal devices reaches a specific threshold.

19 Claims, 5 Drawing Sheets

(56) References Cited

U.S. PATENT DOCUMENTS

| | | | | |
|---|---|---|---|---|
| 2021/0007023 | A1* | 1/2021 | Umapathy | H04W 36/0061 |
| 2021/0203615 | A1* | 7/2021 | Roy | G06N 20/00 |
| 2021/0357722 | A1* | 11/2021 | Jang | H04L 1/242 |
| 2021/0400533 | A1* | 12/2021 | Kwok | H04W 72/1268 |
| 2022/0029892 | A1* | 1/2022 | Hooli | H04W 24/02 |
| 2022/0166687 | A1* | 5/2022 | Mohalik | G06N 5/02 |
| 2022/0232470 | A1* | 7/2022 | Valcarce Rial | H04L 43/08 |
| 2022/0239395 | A1* | 7/2022 | Khafizov | H04W 52/283 |
| 2022/0245441 | A1* | 8/2022 | Dechene | H04L 41/145 |
| 2022/0272794 | A1* | 8/2022 | Aftab | H04L 5/0048 |
| 2022/0327204 | A1* | 10/2022 | Abbaszadeh | H04L 63/1408 |
| 2023/0276263 | A1* | 8/2023 | Rydén | H04W 24/02 455/414.1 |

FOREIGN PATENT DOCUMENTS

| | | | | |
|---|---|---|---|---|
| WO | WO-2021001007 A1 * | 1/2021 | | H04W 24/02 |
| WO | WO-2021239212 A1 * | 12/2021 | | G06N 3/084 |
| WO | WO-2022165143 A1 * | 8/2022 | | G06N 20/20 |
| WO | WO-2022197225 A1 * | 9/2022 | | H04W 28/24 |

* cited by examiner

POLICY DETERMINING METHOD AND APPARATUS

CROSS-REFERENCE TO RELATED APPLICATIONS

This application is a continuation of International Application No. PCT/CN2021/089783, filed on Apr. 26, 2021, the disclosure of which is hereby incorporated by reference in its entirety.

TECHNICAL FIELD

This application relates to the communication field, and more specifically, to a policy determining method and apparatus.

BACKGROUND

When a terminal device accesses a network, a network data analytics function (NWDAF) network element may assist the network in configuring a corresponding access policy for the terminal device. The NWDAF network element generates an artificial intelligence (AI) model through training based on a large amount of obtained data, and generates a data analysis result based on the model. The analysis result may be used for assisting in network policy formulation and execution. For example, the NWDAF network element generates a service experience analysis result based on network data and application function (AF) network element data. The service experience analysis result helps a policy control function (PCF) network element formulate a policy and charging control (PCC) and a quality of service (QoS) policy related to a service of the terminal device.

However, in a current assisted access technology, a corresponding access policy is usually formulated only for service experience of a single terminal device. After an access policy of one terminal device is determined, when an access policy is determined for another terminal device, a conflict may exist between selections of the terminal devices. In addition, considering only service experience inevitably increases network energy consumption, thereby increasing operating costs.

Therefore, a technology needs to be urgently provided, so that an access policy can be formulated for a plurality of terminal devices in a network at the same time, thereby improving overall service experience of the network and reducing network energy consumption.

SUMMARY

This application provides a policy determining method and apparatus, to determine an air interface access policy and/or a user plane path selection policy of a plurality of terminal devices in an area of interest, thereby improving overall service experience of a network and reducing network energy consumption.

According to a first aspect, a policy determining method is provided. The method includes: obtaining, based on a digital twin entity, first data and a label corresponding to the first data; and training, based on the first data and the label corresponding to the first data, to obtain an artificial intelligence AI model. The AI model is configured to obtain an air interface access policy and/or a user plane path selection policy of a plurality of terminal devices in a network or in an area.

According to a technical solution of this application, the method for generating the AI model through training based on a digital twin network helps resolve a problem of the air interface access policy and user plane path selection of the plurality of terminal devices in the network or in the area. This can further ensure that network energy consumption is the lowest when overall average service experience of the terminal devices reaches a specific threshold.

Optionally, the model may be further configured to obtain a quality of service profile allocation policy of the plurality of terminal devices in the network or in the area.

With reference to the first aspect, in some implementations of the first aspect, the method further includes: obtaining second data from a data provider, where the data provider includes an operation, administration and maintenance OAM system, a network function NF network element, and a radio access network RAN network element; and generating the digital twin entity based on the second data.

In this way, a large quantity of training datasets may be obtained from the digital twin entity by using features of low-cost trial-and-error and intelligent decision-making, to train and generate the AI model, to obtain better output information, for example, the air interface access policy and/or the user plane path selection policy of the plurality of terminal devices in the network or in the area.

Optionally, the obtaining, based on a digital twin entity, first data and a label corresponding to the first data specifically includes: obtaining the first data based on the digital twin entity; and obtaining, based on the first data and the digital twin entity, the label corresponding to the first data.

The first data includes at least one of the following historical information of the plurality of terminal devices in the network or in the area: location information, service information, reference signal received power RSRP information, reference signal received quality RSRQ information, and signal to interference plus noise ratio SINR information.

The second data includes at least one of the following information: topology information of network devices in the network or in the area, information about a connection between a terminal device and a network device in the network or in the area, device information or status information of the network device, and device information or status information of the terminal device.

The network device includes at least one of the following: a RAN network element, an access and mobility management function AMF network element, a session management function SMF network element, and a user plane function UPF network element.

When the network device includes the RAN network element, the device information or the status information of the network device may include identification information and service area information of the RAN network element, and the device information or the status information of the terminal device may include the RSRP, RSRQ, and SINR information of the plurality of terminal devices in the area.

When the network device includes the AMF network element, the device information or the status information of the network device may include identification information and service area information of the AMF network element, and the device information or the status information of the terminal device may include the location information of the plurality of terminal devices in the area.

When the network device includes the SMF network element, the device information or the status information of the network device may include identification information and service area information of the SMF network element, and the device information or the status information of the terminal device may include the service information of the plurality of terminal devices in the area.

When the network device includes the UPF network element, the device information or the status information of the network device may include identification information and service area information of the UPF network element, quality of service QoS flow bandwidth information, a packet loss rate, and delay information.

According to a second aspect, a policy determining method is provided. The method includes: obtaining third data, where the third data includes at least one of the following current information of a plurality of terminal devices in a network or in an area: location information, service information, reference signal received power RSRP information, reference signal received quality RSRQ information, and signal to interference plus noise ratio SINR information; and inputting the third data into an artificial intelligence AI model, and obtaining an air interface access policy and/or a user plane path selection policy of the plurality of terminal devices in the network or in the area, where the AI model may be obtained by training according to the method in any one of the implementations of the first aspect.

According to a technical solution of this application, the method for generating the AI model through training based on a digital twin network helps resolve a problem of the air interface access policy and user plane path selection of the plurality of terminal devices in the network or in the area. This can further ensure that network energy consumption is the lowest when overall average service experience of the terminal devices reaches a specific threshold.

With reference to the second aspect, in some implementations of the second aspect, the method further includes: obtaining a quality of service profile allocation policy of the plurality of terminal devices in the network or in the area.

Optionally, when the method is performed by a network data analytics function NWDAF network element, the obtaining third data specifically includes: obtaining the third data from a data provider, where the data provider includes an operation, administration and maintenance OAM system, a network function NF network element, and a radio access network RAN network element; or obtaining the third data by prediction based on first data, where the first data includes at least one of the following historical information of the plurality of terminal devices in the network or in the area: location information, service information, reference signal received power RSRP information, reference signal received quality RSRQ information, and signal to interference plus noise ratio SINR information.

When the method is performed by the NWDAF network element, the method further includes: receiving first information, where the first information is for requesting the air interface access policy and/or the user plane path selection policy of the plurality of terminal devices in the network or in the area; sending second information, where the second information includes the air interface access policy and/or the user plane path selection policy of the plurality of terminal devices in the network or in the area; or sending a neural network model.

The first information may be further for requesting a quality of service configuration policy for application of the plurality of terminal devices in the network or in the area.

Optionally, the first information may be further for requesting screening information, service experience information, and/or network energy consumption information, where the screening information indicates an applicable range of the policy.

Correspondingly, as a response to the first information, the second information may further include the quality of service configuration policy for application of the plurality of terminal devices in the network or in the area.

Optionally, the second information may further include at least one of the following information: validity period information, the service experience information, and the network energy consumption information.

According to a third aspect, a policy determining method is provided. The method includes: sending first information, where the first information is for requesting an air interface access policy and/or a user plane path selection policy of a plurality of terminal devices in a network or in an area; receiving second information, where the second information includes the air interface access policy and/or the user plane path selection policy of the plurality of terminal devices in the network or in the area; or receiving an AI model, where the AI model is configured to obtain the air interface access policy and/or the user plane path selection policy of the plurality of terminal devices in the network or in the area.

The first information is further for requesting a quality of service configuration policy for application of the plurality of terminal devices in the network or in the area.

Optionally, the first information may be further for requesting screening information, service experience information, and/or network energy consumption information, where the screening information indicates an applicable range of the policy.

Correspondingly, as a response to the first information, the second information may further include the quality of service configuration policy for application of the plurality of terminal devices in the network or in the area.

Optionally, the second information further includes at least one of the following information: validity period information, the service experience information, and the network energy consumption information.

According to a fourth aspect, a policy determining apparatus is provided. The apparatus includes: a processing unit, configured to obtain first data and a label corresponding to the first data based on a digital twin entity, where the processing unit is further configured to obtain an artificial intelligence AI model through training based on the first data and the label corresponding to the first data. The AI model is configured to obtain an air interface access policy and/or a user plane path selection policy of a plurality of terminal devices in a network or in an area.

According to a technical solution of this application, the method for generating the AI model through training based on a digital twin network helps resolve a problem of the air interface access policy and user plane path selection of the plurality of terminal devices in the network or in the area. This can further ensure that network energy consumption is the lowest when overall average service experience of the terminal devices reaches a specific threshold.

Optionally, the AI model may be further configured to obtain a quality of service profile allocation policy of the plurality of terminal devices in the network or in the area.

With reference to the fourth aspect, in some implementations of the fourth aspect, the apparatus further includes: a transceiver unit, configured to obtain second data from a data provider, where the data provider includes an operation, administration and maintenance OAM system, a network function NF network element, and a radio access network RAN network element, and the processing unit is further configured to generate the digital twin entity based on the second data.

In this way, a large quantity of training datasets may be obtained from the digital twin entity by using features of low-cost trial-and-error and intelligent decision-making, to train and generate the AI model, to obtain better output information, for example, the air interface access policy and/or the user plane path selection policy of the plurality of terminal devices in the network or in the area.

Optionally, the processing unit is specifically configured to: obtain the first data based on the digital twin entity; and obtain, based on the first data and the digital twin entity, the label corresponding to the first data.

The first data includes at least one of the following historical information of the plurality of terminal devices in the network or in the area: location information, service information, reference signal received power RSRP information, reference signal received quality RSRQ information, and signal to interference plus noise ratio SINR information.

The second data includes at least one of the following information: topology information of network devices in the network or in the area, information about a connection between a terminal device and a network device in the network or in the area, device information or status information of the network device, and device information or status information of the terminal device.

The network device includes at least one of the following: a RAN network element, an access and mobility management function AMF network element, a session management function SMF network element, and a user plane function UPF network element.

When the network device includes the RAN network element, the device information or the status information of the network device may include identification information and service area information of the RAN network element, and the device information or the status information of the terminal device may include the RSRP, RSRQ, and SINR information of the terminal devices in the area.

When the network device includes the AMF network element, the device information or the status information of the network device may include identification information and service area information of the AMF network element, and the device information or the status information of the terminal device may include the location information of the terminal devices in the area.

When the network device includes the SMF network element, the device information or the status information of the network device may include identification information and service area information of the SMF network element, and the device information or the status information of the terminal device may include the service information of the terminal devices in the area.

When the network device includes the UPF network element, the device information or the status information of the network device may include identification information and service area information of the UPF network element, quality of service QoS flow bandwidth information, a packet loss rate, and delay information.

According to a fifth aspect, a policy determining apparatus is provided. The apparatus includes: a transceiver unit, configured to obtain third data, where the third data includes at least one of the following current information of a plurality of terminal devices in a network or in an area: location information, service information, reference signal received power RSRP information, reference signal received quality RSRQ information, and signal to interference plus noise ratio SINR information; and a processing unit, configured to: input the third data into an artificial intelligence AI model, and obtain an air interface access policy and/or a user plane path selection policy of the plurality of terminal devices in the network or in the area, where the AI model may be obtained by training according to the method in any one of the implementations of the first aspect.

According to a technical solution of this application, the method for generating the AI model through training based on a digital twin network helps resolve a problem of the air interface access policy and user plane path selection of the plurality of terminal devices in the network or in the area. This can further ensure that network energy consumption is the lowest when overall average service experience of the terminal devices reaches a specific threshold.

With reference to the fifth aspect, in some implementations of the fifth aspect, the processing unit is further configured to obtain a quality of service profile allocation policy of the plurality of terminal devices in the network or in the area.

Optionally, when the apparatus is an NWDAF network element, the transceiver unit is specifically configured to obtain the third data from a data provider, where the data provider includes an operation, administration and maintenance OAM system, a network function NF network element, and a radio access network RAN network element; or the processing unit is specifically configured to obtain the third data by prediction based on first data, where the first data includes at least one of the following historical information of the plurality of terminal devices in the network or in the area: location information, service information, reference signal received power RSRP information, reference signal received quality RSRQ information, and signal to interference plus noise ratio SINR information.

When the apparatus is the NWDAF network element, the transceiver unit is specifically configured to: receive first information, where the first information is for requesting the air interface access policy and/or the user plane path selection policy of the plurality of terminal devices in the network or in the area; send second information, where the second information includes the air interface access policy and/or the user plane path selection policy of the plurality of terminal devices in the network or in the area; or send a neural network model.

The first information may be further for requesting a quality of service configuration policy for application of the plurality of terminal devices in the network or in the area.

Optionally, the first information may be further for requesting screening information, service experience information, and/or network energy consumption information, where the screening information indicates an applicable range of the policy.

Correspondingly, as a response to the first information, the second information may further include the quality of service configuration policy for application of the plurality of terminal devices in the network or in the area.

Optionally, the second information may further include at least one of the following information: validity period information, the service experience information, and the network energy consumption information.

According to a sixth aspect, a policy determining apparatus is provided. The apparatus includes: a transceiver unit, configured to send first information, where the first information is for requesting an air interface access policy and/or a user plane path selection policy of a plurality of terminal devices in a network or in an area, where the transceiver unit is further configured to receive second information, where the second information includes the air interface access policy and/or the user plane path selection policy of the plurality of terminal devices in the network or in the area, or the transceiver unit is further configured to receive an AI model, where the AI model is configured to obtain the air interface access policy and/or the user plane path selection policy of the plurality of terminal devices in the network or in the area.

The first information is further for requesting a quality of service configuration policy for application of the plurality of terminal devices in the network or in the area.

Optionally, the first information may be further for requesting screening information, service experience information, and/or network energy consumption information, where the screening information indicates an applicable range of the policy.

Correspondingly, as a response to the first information, the second information may further include the quality of service configuration policy for application of the plurality of terminal devices in the network or in the area.

Optionally, the second information further includes at least one of the following information: validity period information, the service experience information, and the network energy consumption information.

According to a seventh aspect, a policy determining apparatus is provided. The apparatus includes a processor, where the processor is coupled to a memory. The memory is configured to store a program or instructions. When the program or the instructions are executed by the processor, the apparatus is enabled to implement the method in any one of the first aspect to the third aspect or the implementations of the first aspect to the third aspect.

Optionally, there are one or more processors, and there are one or more memories.

Optionally, the memory may be integrated with the processor, or the memory and the processor are separately disposed.

According to an eighth aspect, a communication system is provided. The system includes a network data analytics function network element, configured to perform the method in any one of the first aspect to the third aspect or the implementations of the first aspect to the third aspect, and a core network element that communicates with the network data analytics function network element.

According to a ninth aspect, a computer-readable medium is provided. The computer-readable medium stores a computer program (which may also be referred to as code or instructions). When the computer program is run on a computer, the computer is enabled to perform the method in any one of the first aspect to the third aspect or the possible implementations of the first aspect to the third aspect.

According to a tenth aspect, a computer program product is provided. The computer program product includes a computer program (which may also be referred to as code or instructions). When the computer program is run, a computer is enabled to perform the method in any one of the first aspect to the third aspect or the possible implementations of the first aspect to the third aspect.

It should be noted that all or a part of the computer program code may be stored in a first storage medium. The first storage medium may be encapsulated together with a processor, or may be encapsulated separately from a processor. This is not specifically limited in this embodiment of this application.

According to an eleventh aspect, a chip system is provided. The system includes a memory and a processor. The memory is configured to store a computer program, and the processor is configured to invoke the computer program from the memory and run the computer program. A communication apparatus in which the chip system is installed is enabled to perform the method in any one of the first aspect to the third aspect or the possible implementations of the first aspect to the third aspect.

The chip system may include an input circuit or interface configured to send information or data, and an output circuit or interface configured to receive information or data.

DESCRIPTION OF EMBODIMENTS

The following describes technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a $5^{th}$ generation (5G) system, a future 5.5$^{th}$ generation (5.5G) system, a $6^{th}$ generation (6G) system, or a new radio (NR) system.

Figure 1:
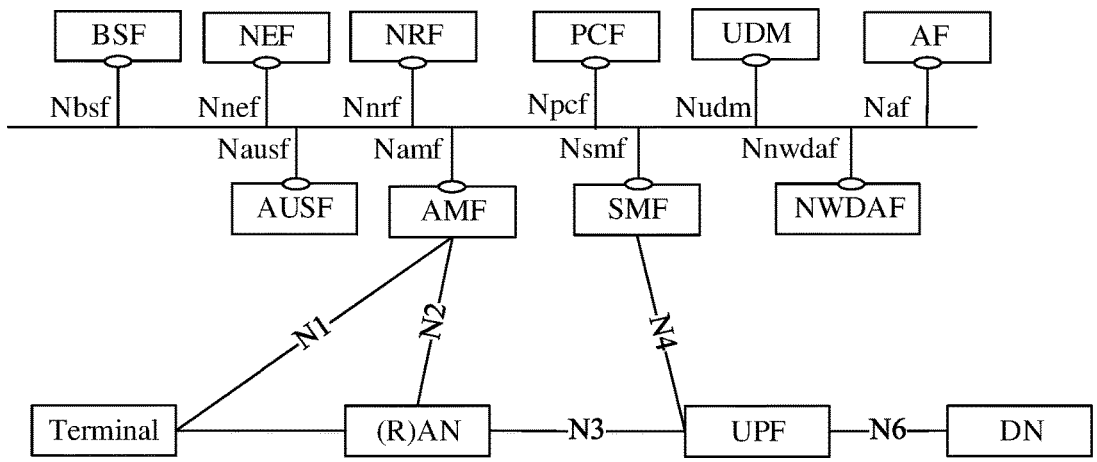
FIG. 1 is a schematic diagram of a communication system applicable to an embodiment of this application.

The following uses the $5^{th}$ generation system as an example, with reference to FIG. 1, to describe an applicable network architecture based on a network data analytics function (NWDAF) network element in this application.

As shown in FIG. 1, the communication system includes but is not limited to the following network elements.

1. Terminal Device

A terminal device in embodiments of this application may also be referred to as user equipment (UE), a mobile station (MS), a mobile terminal (MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device with a wireless connection function. Currently, some examples of the terminal are a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving or autopilot, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device or a computing device that has a wireless communication function or another processing device connected to a wireless modem, a vehicle-mounted device, a wearable device, a terminal device in a future 5G network, a terminal device in a future evolved public land mobile network (PLMN), or the like. This is not limited in embodiments of this application.

By way of example, and not limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that dedicated to only one type of application function and need to work with other devices such as smartphones, such as various smart bands or smart jewelry for monitoring physical signs. In addition, in embodiments of this application, the terminal device may alternatively be a terminal device in an internet of things (IoT) system.

2. Radio Access Network (RAN)

A radio access network is an access network that implements a network access function based on a wireless communication technology. The radio access network can manage a radio resource, provide a radio access service or an air interface access service for a terminal, and further complete forwarding of a control signal and user data between the terminal and a core network.

By way of example, and not limitation, the radio access network may be an evolved NodeB (eNB, or eNodeB) in an LTE system, or may be a radio controller in a cloud radio access network (CRAN) scenario, or the access device may be a relay station, an access point, a vehicle-mounted device, a wearable device, an access device in a 5G network, an access device in a future evolved PLMN network, an access point (AP) in a WLAN, a gNB in an NR system, or the like. This is not limited in this embodiment of this application.

In addition, in this embodiment of this application, when UE accesses the RAN, a proper air interface access policy needs to be selected for the UE, for example, selection of a radio access technology (RAT) and a frequency.

3. Session Management Function (SMF) Network Element

A session management function network element is mainly configured to: perform session management, allocate and manage an internet protocol (IP) address of a terminal device, select an endpoint that can manage a user plane function (UPF) network element and a policy control and charging function interface, notify downlink data, and the like. In this embodiment of this application, the session management function network element may be configured to implement a function of a session management network element.

4. Access and Mobility Management Function (AMF) Network Element

An access and mobility management function network element is mainly configured to perform mobility management, access management, and the like, and may be configured to implement another function other than session management in a mobility management entity (MME) function, for example, an access authorization function. In this embodiment of this application, the access and mobility management function network element may be configured to implement a function of an access and mobility management network element.

It should be understood that in this embodiment of this application, the AMF, the SMF, and some other data providers may also be referred to as data provider network elements. These data provider network elements are usually nodes and physical devices in a network, provide corresponding function support for UE to access a network, perform a session, perform authentication, perform policy control, and the like, and generate corresponding network data.

5. User Plane Function (UPF) Network Element

A user plane function network element may be configured to: perform packet routing and forwarding, process a QoS parameter of user plane data, or the like. User data may be accessed to a data network (DN) through this network element. In this embodiment of this application, the user plane function network element may be configured to implement a function of a user plane network element. For example, when a session is established on different UPFs, service experience of UE is also different. Therefore, the SMF needs to select a proper UPF for a session of the UE.

6. Data Network (DN)

A data network is a specific data service network accessed by UE. For example, a typical DN includes Internet (internet) and an IP multimedia subsystem (IPMS).

7. Network Data Analytics Function (NWDAF) Network Element

A network data analytics function NWDAF network element has at least one of the following functions: a data collection function, a model training function, an analysis result inference function, and an analysis result feedback function. The data collection function is to collect data from a network element, a third-party service server, a terminal device, or a network management system. The model training function is to perform analysis and training based on related input data to obtain a model. The analysis result inference function is to perform inference and determine a data analysis result based on a trained model and inference data. The analysis result feedback function may provide a data analysis result for the network element, the third-party service server, the terminal device, or the network management system, and the analysis result may assist a network in selecting a quality of service parameter of a service, assist the network in performing traffic routing, assist the network in selecting a background traffic transmission policy, or the like. This application mainly relates to the data collection function and the model training function of the NWDAF.

In this embodiment of this application, the NWDAF may be an independent network element, or may be integrated with another core network element. For example, the NWDAF network element may be integrated with an access and mobility management function (AMF) network element, or may be integrated with a session management function (SMF) network element.

Typical application scenarios of the NWDAF include: terminal parameter customization or optimization, where the NWDAF collects information about user connection management, mobility management, session management, an accessed service, and the like, and uses a reliable analysis and prediction model to evaluate and analyze different types of users, constructs user profiles, determines user movement tracks and service usage habits, and predicts user behavior, and a 5G network optimizes a user mobility management parameter, a radio resource management parameter, and the like, based on analysis and prediction data; service (path) optimization, where the NWDAF collects information such as network performance, service load in a specific area, user service experience, and the like, and uses a reliable network performance analysis and prediction model to evaluate and analyze different types of services, constructs service profiles, determines an internal association of service quality of experience (QoE), service experience, a service path, a 5G quality of service (QoS) parameter, and the like, and optimizes a service path, a service route, 5G edge computing, 5G QoS corresponding to a service, and the like; and an AF optimization on a service parameter, where, for example, Internet of Vehicles is an important technology of a 5G network, and in an automatic driving scenario of the Internet of Vehicles, prediction of network performance (for example, QoS information and service load) of a base station that a vehicle is to pass through plays an important role in improving quality of service of the Internet of Vehicles. For example, an Internet of Vehicles server may determine, based on prediction information of the network performance, whether to continue to maintain a self-driving mode. The NWDAF collects information such as network performance, service load in a specific area, and the like, and uses a reliable network performance analysis and prediction model to implement statistics and prediction of the network performance, and assist the AF in optimizing a parameter.

8. Application Function (AF) Network Element

An application function network element is configured to provide a service, or is configured to route data affected by an application, access a network exposure function network element, or exchange service data with an NWDAF network element to perform policy control, or the like.

9. Network Repository Function (NRF) Network Element

A network repository function network element may be configured to: support a network element service or a network element discovery function, receive an NF discovery request from a network function (NF) instance, and provide information about a discovered NF instance for the NF instance. The network repository function network element may be further configured to support maintenance of an available NF instance and an NF configuration file of a service supported by the available NF instance.

10. A network capability exposure function (NEF) network element is configured to: expose, to the outside, a service and network capability information (such as a terminal location and whether a session is reachable) provided by a 3GPP network function, and the like.

11. Policy Control Function (PCF) Network Element

A policy control network element is a unified policy framework configured to guide a network behavior, and provides policy rule information and the like for a control plane function network element (for example, an AMF or an SMF network element).

It should be understood that, in this embodiment of this application, the AF, the PCF, and some other network function (NF) network elements that require a data analysis result may also be referred to as data analysis result subscribers (consumers). The AF, the PCF, and the other network function network elements may subscribe to a corresponding data analysis result from the NWDAF, and make a corresponding adjustment based on the data analysis result. For example, the PCF adjusts a QoS parameter of a service based on a service and service experience fed back by the NWDAF, to better ensure service experience of the service. For another example, an operation, management and maintenance (OAM) network element evaluates a slice service level agreement (SLA) based on service experience of slice UE fed back by the NWDAF, and adjusts slice resource configuration (such as an air interface, a core network and a transmission network).

In the foregoing network architecture, an N2 interface is an interface between the RAN and the AMF network element, and is configured to send a radio parameter, non-access stratum (NAS) signaling, and the like. An N3 interface is an interface between the RAN and the UPF network element, and is configured to transmit user plane data, and the like. An N4 interface is an interface between the SMF network element and the UPF network element, and is configured to transmit information such as a service policy, tunnel identification information of an N3 connection, data buffer indication information, and a downlink data notification message. An N6 interface is an interface between the DN network element and the UPF network element, and is configured to transmit user plane data and the like. A Naf is a service-oriented interface provided by the AF, an Nnrf is a service-oriented interface provided by the NRF, an Nnwdaf is a service-oriented interface provided by the NWDAF, and an Nnef is a service-oriented interface provided by the NEF.

It should be understood that the foregoing network architecture used in embodiments of this application is merely a network architecture described from a perspective of a conventional point-to-point architecture and a service-oriented architecture by using an example. A network architecture applicable to embodiments of this application is not limited thereto. Any network architecture that can implement functions of the foregoing network elements is applicable to embodiments of this application.

It should be understood that names of interfaces between the network elements in FIG. 1 are merely examples, and names of the interfaces in specific implementation may be other names. This is not specifically limited in this application. In addition, names of messages (or signaling) transmitted between the foregoing network elements are merely examples, and constitute no limitation on a function of the messages.

It should be noted that the network element may also be referred to as an entity, a device, an apparatus, a module, or the like. This is not particularly limited in this application. In addition, in this application, for ease of understanding and description, a description of a network element is omitted in some descriptions. For example, an NWDAF network element is referred to as an NWDAF for short. In this case, the "NWDAF" should be understood as the NWDAF network element. Descriptions of a same or similar case are omitted below.

It may be understood that the foregoing function network element may be a network element in a hardware device, or may be a software function running on dedicated hardware, or an instantiated virtualization function on a platform (for example, a cloud platform).

It should be further understood that, in the communication system shown in FIG. 1, functions of the constituent network elements are merely examples. When the constituent network elements are used in embodiments of this application, not all the functions are necessary.

To assist in network policy formulation and execution, the NWDAF obtains related data of each domain such as UE, a network (for example, a RAN, a CN, and a TN), an AF, and an OAM, trains and generates an AI model based on a large amount of obtained data, and generates a data analysis result based on the AI model. For example, the NWDAF generates a service experience analysis result based on AF data. The service experience analysis result helps the PCF formulate a policy and charging control PCC policy and a quality of service QoS policy that are related to a service of the terminal device.

It should be understood that, in embodiments of this application, AI is a technology in which human intelligence is presented by using a computer program, and machine learning (ML) focuses on developing a computer program that can access data and perform self-learning by using the data. In subsequent descriptions, the artificial intelligence and machine learning are not distinguished. For example, an ML model may also be referred to as an AI model. Optionally, the AI model may alternatively be a neural network model, a linear regression model, or another model.

A process of constructing an AI model includes problem analysis (determining data to be collected and a type of the AI model to be used), data collection, model training, model inference, and the like. The model training is a process of determining a parameter of the AI model by using data, and the model inference is a process of predicting an output result by using a trained AI model based on a new input.

For a mainstream supervised learning AI model, a training dataset is required for model training, and includes a model input and a label corresponding to the model input. However, a label of the training data is sometimes difficult to obtain in an actual network and may be obtained from a digital twin entity.

A digital twin network is a virtual representation of a physical network. The digital twin network analyzes, diagnoses, simulates, and controls the physical network based on data, a model, and an interface to implement real-time interaction and mapping between the physical network and a virtual twin network. The digital twin network may be used for a structure or function such as a structure deployment, a network status, and a service process of digital mirroring or a digital simulation real network. In some application scenarios, the digital twin network may also be referred to as a digital twin entity. A specific name of the digital twin network is not limited in this application. Values of the digital twin network are as follows.

(1) Low-cost trial-and-error: Currently, a network structure becomes more and more complex, and optimization costs are high in the actual network, which has great impact on the network. In the digital twin entity, trial-and-error can be performed without risk, and a network optimization solution can be quickly found.

(2) Intelligent decision-making: In the digital twin network, status quo can be evaluated, past can be diagnosed, future can be predicted, and more comprehensive decision support can be provided.

(3) Efficient innovation: It can help a researcher efficiently explore network innovation, and help an operator quickly deploy a new technology, and reduce a risk.

Figure 2:
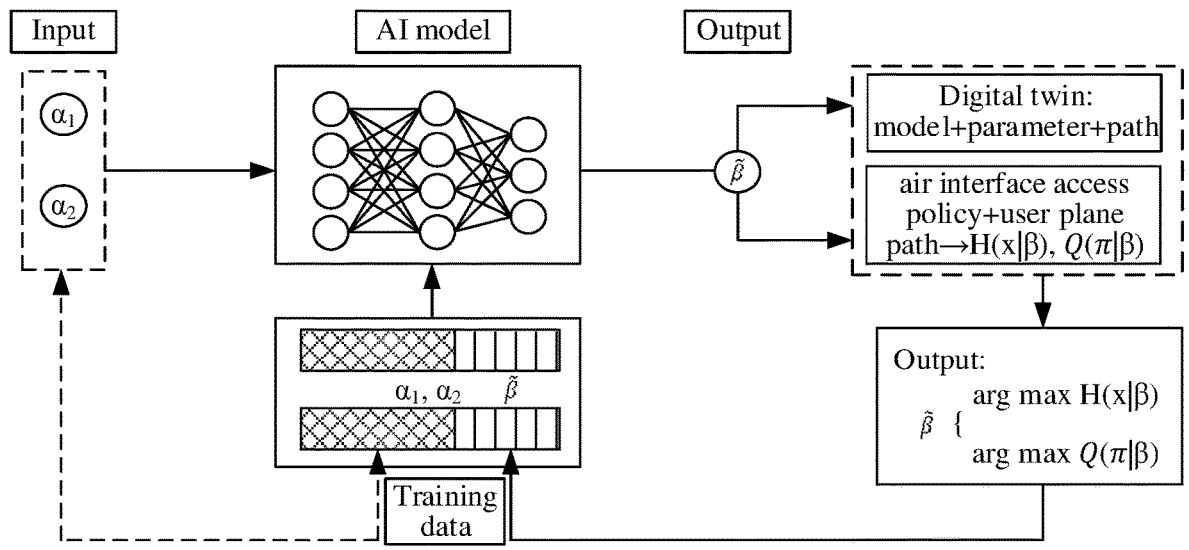
FIG. 2 is a schematic diagram of a structure of an example of an algorithm procedure according to this application.

Therefore, in embodiments of this application, a plurality of different UE access solutions in the digital twin network are considered. FIG. 2 is a schematic diagram of an algorithm procedure according to an embodiment of this application. It should be understood that the algorithm procedure shown in FIG. 2 is merely a possible example, and should not constitute any limitation on this application. An AI model related to this application may alternatively be obtained through training in another algorithm procedure. As shown in FIG. 2, $\alpha_1$ represents a quantity of users (for example, UEs), user location distribution, and user service distribution in an area of interest (AOI), and $\alpha_2$ represents reference signal received power (RSRP) information, reference signal received quality (RSRQ) information, and signal to interference and noise ratio (SINR) information of each UE; $\beta$ represents an air interface access policy and a user plane (UP) path selection solution of each UE, $\hat{\beta}$ is an output value of an AI model, and $\hat{\beta}$ represents an optimal UE access solution corresponding to current network information $\alpha_1$ and $\alpha_2$ found in a digital twin entity, which may also be referred to as an optimal solution; and H(x) represents (weighted) average service experience of UEs in an entire network, and Q(π) represents network energy consumption.

An AI model is trained, so that the optimal UE air interface access policy and UP path selection solution ($\hat{\beta}$) can be obtained based on the current network information ($\alpha_1$ and $\alpha_2$). The foregoing AI model is a supervised model (for example, a deep neural network). When the AI model is trained, model inputs $\alpha_1$ and $\alpha_2$ and a corresponding label $\hat{\beta}$ are required. The model inputs $\alpha_1$ and $\alpha_2$ may be obtained in an actual network. However, the optimal access solution $\hat{\beta}$ corresponding to $\alpha_1$ and $\alpha_2$ is difficult to obtain in the actual network. Therefore, the optimal access solution $\hat{\beta}$ needs to be obtained from a digital twin network.

A manner of obtaining the optimal access solution $\hat{\beta}$ corresponding to the current network information $\alpha_1$ and $\alpha_2$ in the digital twin network is as follows: In the digital twin network, $\alpha_1$ and $\alpha_2$ are fixed, a β parameter is continuously adjusted, and a solution that can maximize H(x) and minimize Q(π) at the same time is found, that is the optimal UE access solution $\hat{\beta}$, and $\hat{\beta}$ is used as a label corresponding to training data $\alpha_1$ and $\alpha_2$ for training an AI model.

In this embodiment of this application, a process of obtaining $\hat{\beta}$ from the digital twin entity is a multi-objective optimization process, and the multi-objective optimization process usually corresponds to a plurality of different solutions. Therefore, a standard needs to be determined based on an actual requirement as an optimal solution. By way of example, and not limitation, in this embodiment of this application, the optimal solution may be defined as a solution that minimizes energy consumption in all solutions in which (weighted) average service experience is greater than a specific threshold (for example, the threshold may be 3.5). Further, if a plurality of βs are close to the optimal solution, a solution with a minimum (weighted) variance of user experience may be selected, thereby obtaining more stable and reliable user experience. Certainly, the optimal solution may alternatively be selected in another manner, to meet different requirements on user experience and network energy consumption. This is not limited in this application.

Figure 3:
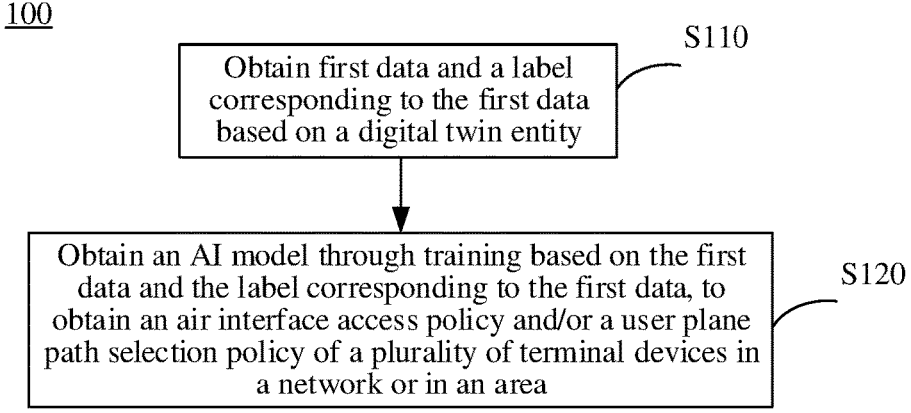
FIG. 3 is a schematic flowchart of an example of a model training process according to this application.

For ease of understanding, FIG. 3 is a brief schematic flowchart of an example of a model training process according to this application. As shown in FIG. 3, in S110, first data and a label corresponding to the first data are obtained based on a digital twin entity.

The first data includes historical data $\alpha_1$ and $\alpha_2$, $\alpha_1$ represents a quantity of users (for example, UEs), user location distribution, and user service distribution in an area of interest, and $\alpha_2$ represents RSRP information, RSRQ information, and SINR information of each UE.

It should be understood that the first data is simply classified into $\alpha_1$ and $\alpha_2$ merely for ease of description. In an actual application, the first data may not be classified. That is, the first data includes at least one of the following historical information of a plurality of terminal devices in a network or in the area: location information, service information, reference signal received power RSRP information, reference signal received quality RSRQ information, and signal to interference plus noise ratio SINR information.

It should be understood that an NWDAF may obtain the first data in another manner, that is, obtain a large amount of first data, that is, the foregoing historical data $\alpha_1$ and $\alpha_2$, from a data provider. For example, the location information of the UE is obtained from an AMF, service type information of the UE is obtained from an SMF, and air interface related information of the UE is obtained from a RAN. In this manner, a large amount of historical data $\alpha_1$ and $\alpha_2$ need to be obtained through obtaining for a plurality of times to meet an objective of obtaining an AI model through training.

After a large amount of first data is obtained, the label corresponding to the first data may be obtained based on the digital twin entity. Specifically, for an AI model with supervised learning, a training dataset includes two parts: a model input and a label (that is, an output) corresponding to the input, that is, the first data and the label corresponding to the first data. The NWDAF network element may obtain a corresponding label $\hat{\beta}$ (that is, the label corresponding to the first data, and an optimal UE access solution) from the digital twin entity based on the input data $\alpha_1$ and $\alpha_2$ (that is, the first data). This process is repeated, and a large amount of $(\alpha_1, \alpha_2, \hat{\beta})$ data may be obtained, and the dataset is used as training data for training the AI model.

After obtaining a large amount of first data and the label corresponding to the first data, the NWDAF may perform S120 to generate the AI model through training based on the first data and the label corresponding to the first data.

The AI model may be configured to obtain an air interface access policy and/or a user plane path selection policy of a plurality of terminal devices in a network or in an area.

Optionally, the model may be further configured to obtain a quality of service profile allocation policy of the plurality of terminal devices in the network or in the area.

According to a technical solution of this application, the method for generating the AI model through training based on a digital twin network helps resolve a problem of the air interface access policy and user plane path selection of the plurality of terminal devices in the network or in the area. This can further ensure that network energy consumption is the lowest when overall average service experience of the terminal devices reaches a specific threshold.

The foregoing describes the AI model training method in embodiments of this application. The following describes in detail a technical solution for determining a policy in this application with reference to FIG. 4 and FIG. 5.

Figure 4:
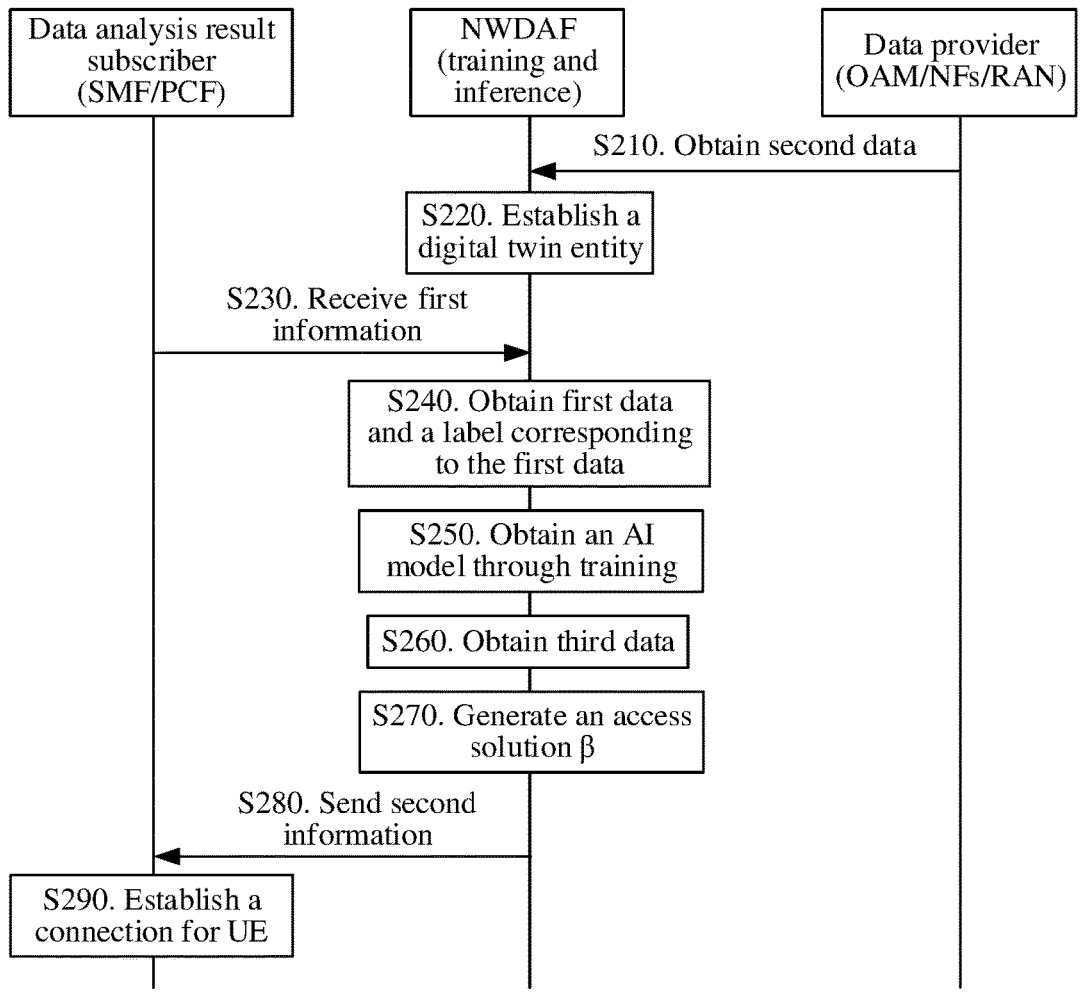
FIG. 4 is a schematic diagram of interaction of another example of a policy determining process according to this application.

FIG. 4 is a schematic diagram of interaction of another example of a policy determining process according to this application. Refer to FIG. 4.

S210. An NWDAF network element obtains second data.

The second data may be collected by the NWDAF network element from a network. A source of the second data is not limited in this embodiment of this application. In a possible implementation, the second data obtained by the NWDAF network element may mainly include the following data: (1) topology information of network devices in an area or in a network that is collected from an OAM, for example, a relationship about connection between an AMF, an SMF, and a UPF; (2) data collected from a RAN network element, for example, identification information and service area information of the RAN network element, and RSRP, RSRQ, and SINR information of a terminal device in the network or in the area; (3) data collected from the AMF network element, for example, identification information and service area information of the AMF network element, and location information of the terminal device in the network or in the area; (4) data collected from the SMF network element, for example, identification information and service area information of the SMF network element, and service information of the terminal device in the network or in the area; and (5) data collected from the UPF network element, for example, identification information and service area information of the UPF network element, quality of service QoS flow bandwidth information, a packet loss rate, and delay information.

After obtaining the second data, the NWDAF network element may perform step S220 to establish a digital twin entity based on the collected second data.

In this embodiment of this application, the digital twin entity is a virtual representation of a physical network, and may analyze, determine, simulate, and control the physical network based on data, a model, and an interface, to implement real-time interaction and mapping between the physical network and a virtual twin network. The digital twin entity can update a parameter based on a real network, and may be used for a structure or function such as a structure deployment, a network status, and a service process of digital mirroring or a digital simulation network.

S230. Receive first information. The first information is from a data analysis result subscriber that requests an access solution from the NWDAF, for example, the SMF or a PCF.

The first information includes data analysis result identification information (analytics ID) and screening information. The data analysis result identification information may indicate a type of a data analysis result that a user is interested in.

In this embodiment of this application, this step is a process in which the data analysis result subscriber requests the NWDAF network element for an air interface access policy and a user plane path selection solution of the terminal device in the area of interest. Therefore, analytics ID=access policy and/or UP paths. One data analysis result subscriber may request two policies at the same time, that is, analytics ID=access policy and UP paths. Alternatively, one data analysis result subscriber may request one policy. For example, the PCF requests the air interface access policy (analytics ID=access policy), and the SMF requests the UP path selection solution (analytics ID=UP paths).

Optionally, the data analysis result subscriber may further request the NWDAF network element for a quality of service profile allocation policy (analytics ID=QoS profile) of a plurality of terminal devices in the area of interest. The quality of service profile allocation policy may provide quality of service flow (QoS Flow) configuration information of each terminal device in the area of interest, for example, QoS parameter configuration information such as a 5G quality of service identifier (5G QoS identifier, 5QI), an allocation and retention priority (ARP), a guaranteed flow bit rate (GFBR), and a maximum flow bit rate (MFBR).

The screening information may be used for limiting a range of a data analysis or indicates an applicable range of the data analysis result, and the range may be referred to as an area of interest. A specific form of the screening information is not limited in this application. For example, the screening information may be one UE list, and the data analysis is performed only on a UE in the list, or the data analysis result is applicable only to the UE in the list. Similarly, the screening information may be further divided in another form, for example, one UE group, or a UE in one network slice.

Optionally, the first information may further include a service experience threshold, solution validity period information, and network energy consumption information. The service experience threshold may be used for providing a basis for the NWDAF network element to find an optimal access solution in the digital twin entity. For example, as described above, a process of obtaining $\hat{\beta}$ from the digital twin entity is a multi-objective optimization process, and a solution that minimizes energy consumption needs to be selected from all solutions whose (weighted) average service experience is greater than a threshold. The threshold herein is service experience threshold information provided by the user to the NWDAF. In addition, the service experience threshold may be in different forms according to different requirements of the data analysis result subscriber. As an example, the service experience threshold may be an average service experience threshold of a plurality of UEs in one area. In this way, service experience of the UEs in the area can be ensured to a maximum extent. Similarly, to meet a requirement of some specific UEs, the service experience threshold may alternatively be a service experience threshold of these specific UEs. In addition, the service experience threshold may alternatively be a weighted average service experience threshold of a plurality of UEs, or the like. Details are not described herein again.

To train the AI model, the NWDAF network element may perform S240 to obtain the first data and the label corresponding to the first data.

The first data includes $\alpha_1$ and $\alpha_2$, where $\alpha_1$ represents a quantity of users (for example, UEs), user location distribution, and user service distribution in the area of interest; and $\alpha_2$ represents RSRP information, RSRQ information, and SINR information of each UE.

It should be understood that the NWDAF may obtain the first data in two manners. In one manner, similar to the descriptions in step S210, the NWDAF obtains a large amount of historical data of $\alpha_1$ and $\alpha_2$ from a data provider. For example, the location information of the UE is obtained from the AMF, service type information of the UE is obtained from the SMF, and air interface related information of the UE is obtained from the RAN. Different from step S210, where obtaining is performed once, this step needs to obtain $\alpha_1$ and $\alpha_2$ for a plurality of times to obtain a large amount of historical data, to meet an objective of obtaining the AI model through training. In another manner, a simulated analog feature of the digital twin entity is used, that is, a large amount of $\alpha_1$ and $\alpha_2$ may be generated in the digital twin entity. For ease of differentiation, the $\alpha_1$ and $\alpha_2$ may also be referred to as historical $\alpha_1$ and $\alpha_2$, for obtaining the AI model through training.

After obtaining a large amount of first data and the label corresponding to the first data, the NWDAF may perform S250 to generate the AI model through training.

Specifically, for an AI model with supervised learning, a training dataset includes two parts: a model input and a label (that is, an output) corresponding to the input, that is, the first data and the label corresponding to the first data. The NWDAF network element may obtain a corresponding label (that is, an optimal UE access solution) from the digital twin entity based on the input data $\alpha_1$ and $\alpha_2$. This process is repeated. A large amount of ($\alpha_1$, $\alpha_2$, $\hat{\beta}$) data may be obtained, and the dataset is used as training data for training the AI model.

The AI model may be an ML model, a neural network model, a linear regression model, or another model that can implement the foregoing function.

After the AI model is obtained through training, the NWDAF network element may perform inference by using the AI model, to obtain an access solution of each UE in the area of interest. During model inference, the NWDAF network element may perform step S260 to obtain third data, where the third data is current data $\alpha_1$ and $\alpha_2$ of the network, and the third data may be obtained from the network, or may be obtained by prediction by using the first data, that is, the current $\alpha_1$ and $\alpha_2$ are obtained by prediction based on historical data of $\alpha_1$ and $\alpha_2$.

After obtaining the current data $\alpha_1$ and $\alpha_2$ of the network, the NWDAF network element may perform step S270, and use the current $\alpha_1$ and $\alpha_2$ as an input of the AI model, to obtain a current access solution of each UE by inference.

Optionally, the AI model may further output information related to the access solution, for example, a solution validity period, service experience information, and network energy consumption information.

The solution validity period represents a valid time range of the foregoing access solution, and a solution that exceeds the validity period is considered invalid. This can ensure feasibility of the solution. The service experience information is information such as, after the NWDAF infers a real-time or predicted UE access solution by using the AI model, (weighted) average service experience of a UE in an AOI corresponding to the solution and a service experience variance of the UE in the AOI that are obtained from the digital twin entity. The information indicates a possible service experience effect of the provided UE access solution, for example, the foregoing service experience threshold. Similarly, the network energy consumption information may indicate possible network energy consumption required by the provided UE access solution.

S280. Send second information.

After obtaining the user access solution, the NWDAF network element may send the second information to provide feedback for the data analysis result subscriber. The second information includes an air interface access policy list and a user plane path selection solution list of a plurality of UEs. The second information may further include other information, for example, a solution validity period, service experience information, and network energy consumption information.

S290. The data analysis result subscriber establishes a connection for the UE.

After receiving the second information provided by the NWDAF, the data analysis result subscriber may establish a corresponding air interface connection and a corresponding user plane connection for the UE, by using the data analysis result subscriber or by using another network element, based on the air interface access policy and the UP path selection solution that are fed back by the NWDAF. For example, when the foregoing data analysis result subscriber is the PCF, the PCF may formulate a proper RFSP indicator value for each UE in the AOI based on the air interface access policy, and send the RFSP indicator value to the RAN by using the AMF, so that the RAN correspondingly selects a proper RAT radio access technology/frequency for each UE based on the RFSP indicator value. For another example, when the foregoing data analysis result subscriber is the SMF, the SMF may select a proper UPF and/or DN for a PDU session of each UE in the AOI based on the user plane path selection solution.

According to a technical solution of this application, the method for generating the AI model through training based on a digital twin network helps resolve a problem of the air interface access policy and user plane path selection of the plurality of terminal devices in the network or in the area. This can further ensure that network energy consumption is the lowest when overall average service experience of the terminal devices reaches a specific threshold.

Figure 5:
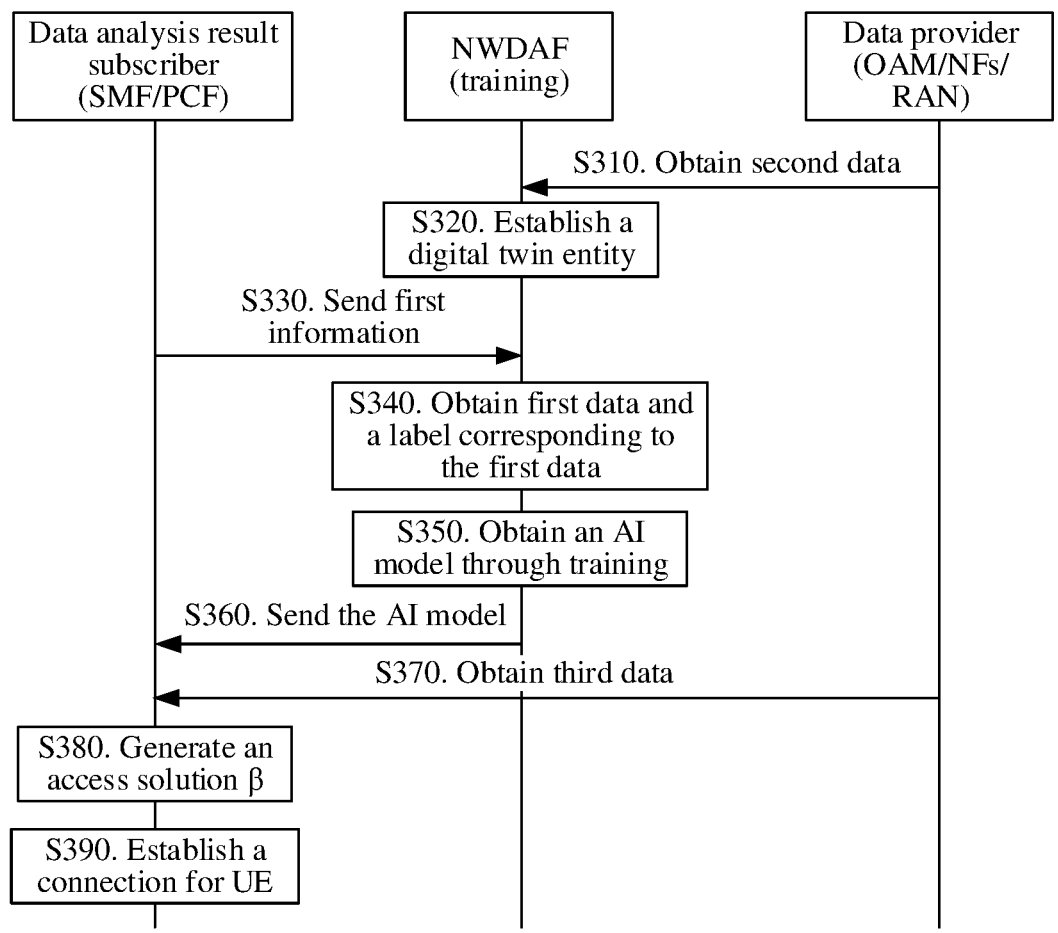
FIG. 5 is a schematic diagram of interaction of still another example of a policy determining process according to this application.

In the foregoing process, the NWDAF is responsible for a process of AI model training and inference, and sends a result obtained by inference to the data analysis result subscriber. In an actual application, the process of AI model training and inference may be implemented separately. That is, the NWDAF is responsible for training the AI model, and the data analysis result subscriber implements the model inference. FIG. 5 is a schematic diagram of interaction of still another example of a policy determining process according to this application.

In FIG. 5, step S310 to step S350 are the same as step S210 to step S250 in FIG. 4, and details are not described herein again.

In response to first information, an NWDAF may perform step S360 to send an AI model obtained through training in step S310 to step S350 to a data analysis result subscriber, and the data analysis result subscriber generates an access solution for a plurality of terminal devices in a network or in an area based on an actual requirement.

Optionally, the data analysis result subscriber may further generate a quality of service profile allocation policy (analytics ID=QoS profile) of the plurality of terminal devices in the network or in the area based on an actual requirement. The quality of service profile allocation policy may provide quality of service flow (QoS Flow) configuration information of each terminal device in an area of interest, for example, QoS parameter configuration information such as a 5G quality of service identifier 5QI, an allocation and retention priority ARP, a guaranteed flow bit rate GFBR, and a maximum flow bit rate MFBR.

In S370, the data analysis result subscriber obtains third data, where the third data is obtained by the data analysis result subscriber from a network. The third data is current data $\alpha_1$ and $\alpha_2$, and may specifically include at least one of the following current information of the plurality of terminal devices in the network or in the area: location information, service information, reference signal received power RSRP information, reference signal received quality RSRQ information, and signal to interference plus noise ratio SINR information.

After obtaining the current data $\alpha_1$ and $\alpha_2$ of the network, the data analysis result subscriber may perform step S380, and use the current $\alpha_1$ and $\alpha_2$ as an input of the AI model, to obtain a current access solution of each UE by inference.

Optionally, the AI model may further output information related to the access solution, for example, a solution validity period, service experience information, and network energy consumption information.

The solution validity period represents a valid time range of the foregoing access solution, and a solution that exceeds the validity period is considered invalid. This can ensure feasibility of the solution. The service experience information is information such as, after the NWDAF infers a real-time or predicted UE access solution by using the AI model, (weighted) average service experience of a UE in an AOI corresponding to the solution and a service experience variance of the UE in the AOI that are obtained from a digital twin entity. The information indicates a possible service experience effect of the provided UE access solution, for example, a service experience threshold. Similarly, the network energy consumption information may indicate possible network energy consumption required by the provided UE access solution.

After obtaining a target access solution, the data analysis result subscriber may establish a corresponding air interface connection and a corresponding user plane connection for the UE, by using the data analysis result subscriber or by using another network element, based on an air interface access policy and a UP path selection solution that are obtained through AI model inference. For example, when the foregoing data analysis result subscriber is a PCF, the PCF may formulate a proper RF SP indicator value for each UE in the AOI based on the air interface access policy, and send the RFSP indicator value to a RAN by using an AMF, so that the RAN correspondingly selects a proper RAT radio access technology/frequency for each UE based on the RFSP indicator value. For another example, when the foregoing data analysis result subscriber is an SMF, the SMF may select a proper UPF and/or DN for a PDU session of each UE in the AOI based on the user plane path selection solution.

According to a technical solution of this application, the method for generating the AI model through training based on a digital twin network helps resolve a problem of the air interface access policy and user plane path selection of the plurality of terminal devices in the network or in the area. This can further ensure that network energy consumption is the lowest when overall average service experience of the terminal devices reaches a specific threshold.

It should be understood that specific examples in embodiments of this application are merely intended to help a person skilled in the art better understand embodiments of this application, but are not intended to limit a scope of embodiments of this application.

It should be further understood that sequence numbers of the foregoing processes do not mean execution sequences. The execution sequences of the processes should be determined based on functions and internal logic of the processes, and should not constitute any limitation on implementation processes of embodiments of this application.

It should be further understood that, in embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that, in the foregoing embodiments of this application, a method implemented by a communication device may alternatively be implemented by a component (for example, a chip or a circuit) disposed inside the communication device.

A policy determining method provided in embodiments of this application is described in detail above with reference to FIG. 3 to FIG. 5. The policy determining method is mainly described from a perspective of interaction between network elements. It may be understood that, to implement the foregoing functions, each network element includes a corresponding hardware structure and/or software module for performing each function. A person skilled in the art may be aware that, with reference to the examples described in embodiments disclosed in this specification, units and algorithm steps can be implemented by hardware or a combination of computer software and hardware in this application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

Figure 6:
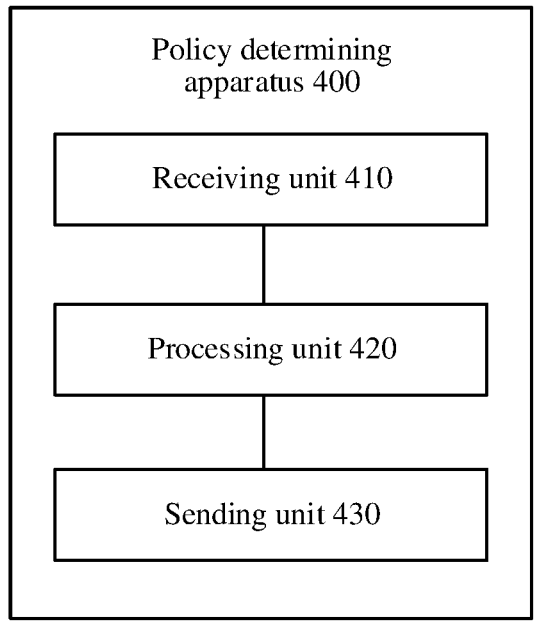
FIG. 6 is a schematic block diagram of an example of a policy determining apparatus according to this application.
Figure 7:
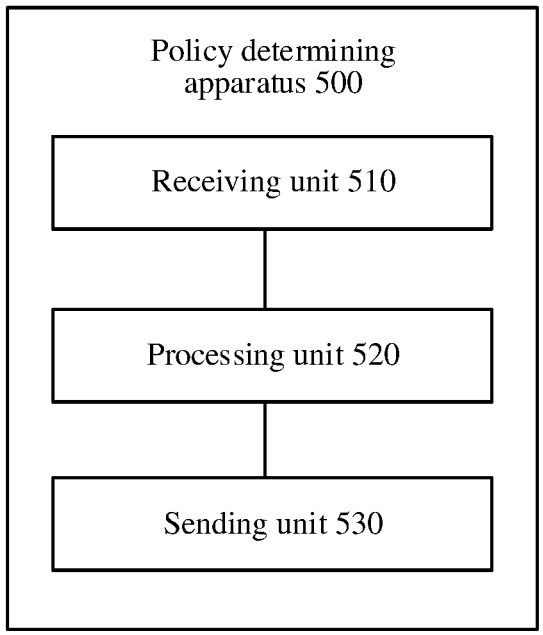
FIG. 7 is a schematic block diagram of another example of a policy determining apparatus according to this application.
Figure 8:
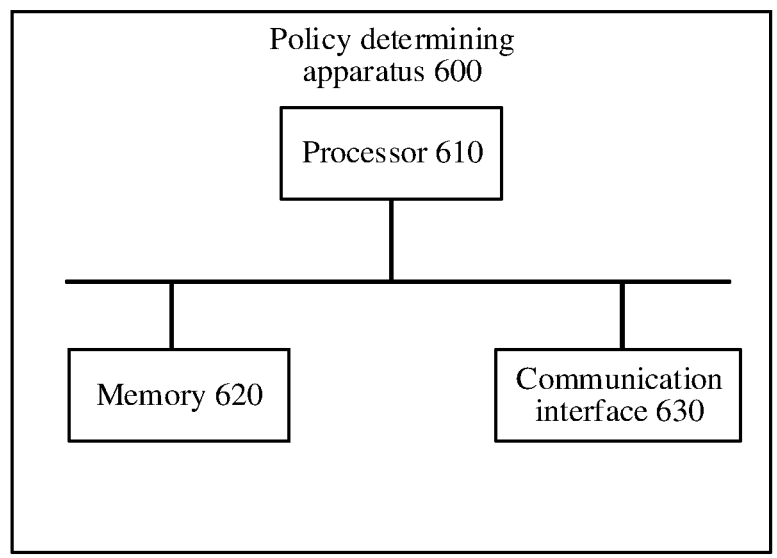
FIG. 8 is a schematic diagram of a structure of an example of a policy determining apparatus according to this application.

The following describes in detail a policy determining apparatus provided in embodiments of this application with reference to FIG. 6 to FIG. 8. It should be understood that the descriptions of the apparatus embodiments correspond to the descriptions of the method embodiments. Therefore, for content that is not described in detail, refer to the foregoing method embodiments. For brevity, some content is not described again.

In embodiments of this application, functional modules of a transmit end device or a receive end device may be obtained through division according to the foregoing method examples. For example, each functional module may be obtained through division based on each function, or two or more functions may be integrated into one processing module. The integrated module may be implemented in a form of hardware, or may be implemented in a form of a software functional module. It should be noted that, in embodiments of this application, module division is an example, and is merely a logical function division. In an actual implementation, another division manner may be used. The following provides description by using an example in which each function module is obtained through division based on each corresponding function.

FIG. 6 is a schematic block diagram of an example of a policy determining apparatus 400 according to this application.

The policy determining apparatus includes a receiving unit 410, a processing unit 420, and a sending unit 430. The policy determining apparatus 400 may be the data analysis device in the foregoing method embodiment, or may be a chip configured to implement a function of the data analysis device in the foregoing method embodiment.

It should be understood that the policy determining apparatus 400 may be corresponding to the data analysis device in the method 100 to the method 300 according to embodiments of this application. The policy determining apparatus 400 may include units configured to perform the methods performed by the data analysis device in FIG. 3 to FIG. 5. In addition, the units in the policy determining apparatus 400 and the foregoing other operations and/or functions respectively implement corresponding procedures of the method 100 to the method 300 in FIG. 3 to FIG. 5.

In a possible design, the policy determining apparatus 400 may implement any function of the data analysis device NWDAF in the embodiment shown in any one of FIG. 3 to FIG. 5.

For example, the processing unit 420 is configured to obtain, based on a digital twin entity, first data and a label corresponding to the first data; the processing unit 420 is further configured to obtain an artificial intelligence AI model through training based on the first data and the label corresponding to the first data. The AI model is configured to obtain an air interface access policy and/or a user plane path selection policy of a plurality of terminal devices in a network or in an area.

According to a technical solution of this application, the method for generating the AI model through training based on a digital twin network helps resolve a problem of the air interface access policy and user plane path selection of the plurality of terminal devices in the network or in the area. This can further ensure that network energy consumption is the lowest when overall average service experience of the terminal devices reaches a specific threshold.

Optionally, the AI model may be further configured to obtain a quality of service profile allocation policy of the plurality of terminal devices in the network or in the area.

The apparatus further includes: the receiving unit 410, configured to obtain second data from a data provider, where the data provider includes an operation, administration and maintenance OAM system, a network function NF network element, and a radio access network RAN network element, and the processing unit 420 is further configured to generate the digital twin entity based on the second data.

In this way, a large quantity of training datasets may be obtained from the digital twin entity by using features of low-cost trial-and-error and intelligent decision-making, to train and generate the AI model, to obtain better output information, for example, the air interface access policy and/or the user plane path selection policy of the plurality of terminal devices in the network or in the area.

Optionally, the processing unit 420 is specifically configured to: obtain the first data based on the digital twin entity; and obtain, based on the first data and the digital twin entity, the label corresponding to the first data.

The first data includes at least one of the following historical information of the plurality of terminal devices in the network or in the area: location information, service information, reference signal received power RSRP information, reference signal received quality RSRQ information, and signal to interference plus noise ratio SINR information.

The second data includes at least one of the following information: topology information of network devices in the network or in the area, information about a connection between a terminal device and a network device in the network or in the area, device information or status information of the network device, and device information or status information of the terminal device.

The network device includes at least one of the following: a RAN network element, an access and mobility management function AMF network element, a session management function SMF network element, and a user plane function UPF network element.

When the network device includes the RAN network element, the device information or the status information of the network device may include identification information and service area information of the RAN network element, and the device information or the status information of the terminal device may include the RSRP, RSRQ, and SINR information of the terminal devices in the area.

When the network device includes the AMF network element, the device information or the status information of the network device may include identification information and service area information of the AMF network element, and the device information or the status information of the terminal device may include the location information of the terminal devices in the area.

When the network device includes the SMF network element, the device information or the status information of the network device may include identification information and service area information of the SMF network element, and the device information or the status information of the terminal device may include the service information of the terminal devices in the area.

When the network device includes the UPF network element, the device information or the status information of the network device may include identification information and service area information of the UPF network element, quality of service QoS flow bandwidth information, a packet loss rate, and delay information.

For another example, the receiving unit 410 is configured to obtain third data, where the third data includes at least one of the following current information of the plurality of terminal devices in the network or in the area: location information, service information, reference signal received power RSRP information, reference signal received quality RSRQ information, and signal to interference plus noise ratio SINR information; and the processing unit 420 is configured to input the third data into the artificial intelligence AI model, and obtain the air interface access policy and/or the user plane path selection policy of the plurality of terminal devices in the network or in the area, where the AI model may be obtained through training by using the foregoing method.

According to a technical solution of this application, the method for generating the AI model through training based on a digital twin network helps resolve a problem of the air interface access policy and user plane path selection of the plurality of terminal devices in the network or in the area. This can further ensure that network energy consumption is the lowest when overall average service experience of the terminal devices reaches a specific threshold.

The processing unit 420 is further configured to obtain a quality of service profile allocation policy of the plurality of terminal devices in the network or in the area.

Optionally, the receiving unit 410 is specifically configured to obtain the third data from the data provider, where the data provider includes the operation, administration and maintenance OAM system, the network function NF network element, and the radio access network RAN network element; or the processing unit 420 is specifically configured to obtain the third data by prediction based on first data, where the first data includes at least one of the following historical information of the plurality of terminal devices in the network or in the area: location information, service information, reference signal received power RSRP information, reference signal received quality RSRQ information, and signal to interference plus noise ratio SINR information.

The receiving unit 410 is specifically configured to receive first information, where the first information is for requesting the air interface access policy and/or the user plane path selection policy of the plurality of terminal devices in the network or in the area. The sending unit 430 is configured to send second information, where the second information includes the air interface access policy and/or the user plane path selection policy of the plurality of terminal devices in the network or in the area; or send a neural network model.

The first information may be further for requesting a quality of service configuration policy for application of the plurality of terminal devices in the network or in the area.

Optionally, the first information may be further for requesting screening information, service experience information, and/or network energy consumption information, where the screening information indicates an applicable range of the policy.

Correspondingly, as a response to the first information, the second information may further include the quality of service configuration policy for application of the plurality of terminal devices in the network or in the area.

Optionally, the second information may further include at least one of the following information: validity period information, the service experience information, and the network energy consumption information.

FIG. 7 is a schematic diagram of a structure of a policy determining apparatus 500. The policy determining apparatus includes a receiving unit 510 and a sending unit 530. The policy determining apparatus 500 may be the data analysis result subscriber device in the foregoing method embodiment, or may be a chip configured to implement a function of the data analysis result subscriber device in the foregoing method embodiment.

In a possible design, the policy determining apparatus 500 may implement any function of the data analysis result subscriber device in the embodiment shown in any one of FIG. 3 to FIG. 5.

For example, the sending unit 530 is configured to send first information, where the first information is for requesting an air interface access policy and/or a user plane path selection policy of a plurality of terminal devices in a network or in an area; and the receiving unit 510 is configured to receive second information, where the second information includes the air interface access policy and/or the user plane path selection policy of the plurality of terminal devices in the network or in the area; or the receiving unit 510 is further configured to receive an AI model, where the AI model is configured to obtain the air interface access policy and/or the user plane path selection policy of the plurality of terminal devices in the network or in the area.

The first information is further for requesting a quality of service configuration policy for application of the plurality of terminal devices in the network or in the area.

Optionally, the first information may be further for requesting screening information, service experience information, and/or network energy consumption information, where the screening information indicates an applicable range of the policy.

Correspondingly, as a response to the first information, the second information may further include the quality of service configuration policy for application of the plurality of terminal devices in the network or in the area.

Optionally, the second information further includes at least one of the following information: validity period information, the service experience information, and the network energy consumption information.

FIG. 8 is a block diagram of a structure of a policy determining apparatus 600 according to an embodiment of this application. The policy determining apparatus 600 shown in FIG. 8 includes a processor 610, a memory 620, and a communication interface 630. The processor 610 is coupled to the memory, and is configured to execute instructions stored in the memory, to control the communication interface 630 to send a signal and/or receive a signal.

It should be understood that the processor 610 and the memory 620 may be combined into one processing apparatus, and the processor 610 is configured to execute program code stored in the memory 620 to implement the foregoing functions. In a specific implementation, the memory 620 may also be integrated into the processor 610, or may be independent of the processor 610.

In a possible design, the policy determining apparatus 600 may be the data analysis device in the foregoing method embodiment, or may be a chip configured to implement a function of the data analysis device in the foregoing method embodiment.

Specifically, the policy determining apparatus 600 may be corresponding to the data analysis device in the method 100 to the method 300 according to embodiments of this application. The policy determining apparatus 600 may include units configured to perform the methods performed by the data analysis device in FIG. 3 to FIG. 5. In addition, the units in the policy determining apparatus 600 and the foregoing other operations and/or functions respectively implement corresponding procedures of the method 100 to the method 300. It should be further understood that a specific process in which the units perform the foregoing corresponding steps is described in detail in the foregoing method embodiments, and for brevity, details are not described herein.

When the policy determining apparatus 600 is a chip, the chip includes a transceiver unit and a processing unit. The transceiver unit may be an input/output circuit or a communication interface. The processing unit may be a processor, a microprocessor, or an integrated circuit integrated on the chip. An embodiment of this application further provides a processing apparatus, including a processor and an interface. The processor may be configured to perform the method in the foregoing method embodiment.

It should be understood that the processing apparatus may be a chip. For example, the processing apparatus may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an implementation process, steps in the foregoing methods can be implemented by using a hardware integrated logical circuit in the processor, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in a memory, and the processor reads information in the memory and completes the steps in the foregoing methods in combination with hardware of the processor. To avoid repetition, details are not described herein again.

It should be noted that, the processor in this embodiment of this application may be an integrated circuit chip, and has a signal processing capability. In an implementation process, the steps in the foregoing method embodiments may be implemented by using an integrated logic circuit of hardware in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly performed and accomplished through a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in a memory, and the processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch-link DRAM, SLDRAM), and a direct rambus dynamic random access memory (direct ram-bus RAM, DR RAM). It should be noted that the memory of the system and method described in this specification includes but is not limited to these memories and any other memory of a proper type.

According to the method provided in embodiments of this application, this application further provides a computer program product. The computer program product includes computer program code. When the computer program code is run on a computer, the computer is enabled to perform the method in any one of embodiments shown in FIG. 3 to FIG. 5.

According to the method provided in embodiments of this application, this application further provides a computer-readable medium. The computer-readable medium stores program code. When the program code is run on a computer, the computer is enabled to perform the method in any one of embodiments shown in FIG. 4 to FIG. 8.

According to the methods provided in embodiments of this application, this application further provides a system. The system includes the foregoing apparatus or device.

All or a part of the foregoing embodiments may be implemented by software, hardware, firmware, or any combination thereof. When software is used for implementing embodiments, all or a part of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and the components may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the internet interacting with other systems by using the signal).

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be further understood that numbers "first", "second", "#a", "#b", "#1", "#2", and the like are introduced in embodiments of this application only to distinguish between different objects, for example, distinguish between different "information", "device vendors", "devices", or "units". Understanding of a specific object and a correspondence between different objects should be determined based on functions and internal logic of the specific object, and shall not constitute any limitation on an implementation process of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A policy determining method, comprising:
   obtaining, by a network data analytics function network element and from a digital twin network, first data and a label corresponding to the first data;
   obtaining, by a network data analytics function network element and through training based on the first data and the label corresponding to the first data, an artificial intelligence (AI) model, wherein the AI model is configured to obtain an air interface access policy and/or a user plane path selection policy of a plurality of terminal devices in a network or in an area of interest, and sending, by the network data analytics function network element to provide feedback for a data analysis result subscriber, second information that includes an air interface access policy list and/or a user plane path selection solution list of the plurality of terminal devices, wherein the label is an access solution, and wherein the first data comprises at least one historical information of the plurality of terminal devices in the network or in the area of interest, wherein the historical information is at least one of an information type taken from the group consisting of:

location information, service information, reference signal received power, RSRP, information, reference signal received quality, RSRQ, information, and signal to interference plus noise ratio (SINR) information.

2. The method according to claim 1, wherein the AI model is further configured to obtain a quality of service profile allocation policy of the plurality of terminal devices in the network or in the area of interest.

3. The method according to claim 1, wherein the method further comprises: obtaining second data from a data provider that comprises an operation, administration and maintenance (OAM) system, a network function (NF) network element, and a radio access network (RAN) network element; and wherein the method further comprises generating the digital twin network based on the second data.

4. The method according to claim 1, wherein the obtaining first data and a label corresponding to the first data comprises:

obtaining the first data based on the digital twin network; and obtaining the label corresponding to the first data based on the first data and the digital twin network.

5. The method according to claim 1, further comprising obtaining second data comprising at least one information that is at least one of an information type taken from the group consisting of:

topology information of network devices in the network or in the area of interest, information about a connection between a terminal device and a network device in the network or in the area of interest, device information or status information of a network device in the network or in the area of interest, and device information or status information of a terminal device in the network or in the area of interest.

6. The method according to claim 5, wherein the network device comprises at least one of the group consisting of:

a RAN network element, an access and mobility management function (AMF) network element, a session management function (SMF) network element, and a user plane function (UPF) network element.

7. The method according to claim 6, wherein the network device is a particular type and information provided by the network device is taken from the group consisting of:

the network device comprises the RAN network element, and the device information or the status information of the network device comprises identification information and service area information of the RAN network element, and the device information or the status information of the terminal device comprises the RSRP, RSRQ, and SINR information of the plurality of terminal devices in the area of interest;

the network device comprises the AMF network element, and the device information or the status information of the network device comprises identification information and service area information of the AMF network element, and the device information or the status information of the terminal device comprises the location information of the plurality of terminal devices in the area of interest;

the network device comprises the SMF network element, and the device information or the status information of the network device comprises identification information and service area information of the SMF network element, and the device information or the status information of the terminal device comprises the service information of the plurality of terminal devices in the area of interest; and the network device comprises the UPF network element, and the device information or the status information of the network device comprises identification information and service area information of the UPF network element, quality of service QoS flow bandwidth information, a packet loss rate, and delay information.

8. A policy determining method, comprising:

obtaining an AI model according to a method comprising:
obtaining, from a digital twin network, first data and a label corresponding to the first data; and
obtaining, through training based on the first data and the label corresponding to the first data, an artificial intelligence (AI) model, wherein the AI model is configured to obtain an air interface access policy and/or a user plane path selection policy of a plurality of terminal devices in a network or in an area of interest;

obtaining third data, wherein the third data comprises current information of a plurality of terminal devices in a network or in an area of interest, wherein current information is an information type taken from the group consisting of:

location information, service information, reference signal received power (RSRP) information, reference signal received quality (RSRQ) information, and signal to interference plus noise ratio (SINR) information;

inputting the third data into the AI model; and obtaining an air interface access policy and/or a user plane path selection policy of the plurality of terminal devices in the network or in the area of interest.

9. The method according to claim 8, wherein the method further comprises:

obtaining a quality of service profile allocation policy of the plurality of terminal devices in the network or in the area of interest.

10. The method according to claim 8, wherein the method is performed by a network data analytics function (NWDAF) network element, and the obtaining third data comprises:

obtaining the third data from a data provider, wherein the data provider comprises an operation, administration and maintenance (OAM) system, a network function (NF) network element, and a radio access network (RAN) network element; or obtaining the third data by prediction based on first data, wherein the first data comprises at least one of the following historical information of the plurality of terminal devices in the network or in the area of interest taken from the group consisting of:

location information, service information, reference signal received power (RSRP) information, reference signal received quality (RSRQ) information, and signal to interference plus noise ratio (SINR) information.

11. The method according to claim 8, when the method is performed by the NWDAF network element, and wherein the method further comprises:

receiving first information, wherein the first information is for requesting the air interface access policy and/or the user plane path selection policy of the plurality of terminal devices in the network or in the area of interest; and sending second information, wherein the second information comprises the air interface access policy and/or the user plane path selection policy of the plurality of terminal devices in the network or in the area of interest; or sending the AI model.

12. The method according to claim 11, wherein the first information is further for requesting a quality of service configuration policy for application of the plurality of terminal devices in the network or in the area of interest.

13. The method according to claim 11, wherein the first information is further for requesting screening information, service experience information, and/or network energy consumption information; and wherein the screening information indicates an applicable range of the air interface access policy and/or the user plane path selection policy and/or a quality of service configuration policy.

14. The method according to claim 11, wherein the second information further comprises a quality of service configuration policy for application of the plurality of terminal devices in the network or in the area of interest.

15. The method according to claim 8, wherein the second information further comprises at least one of the following information taken from the group consisting of:

validity period information, service experience information, and network energy consumption information.

16. A policy determining apparatus, comprising:
at least one processor; and
at least one memory, wherein the at least one memory is coupled to the at least one processor and stores programming instructions for execution by the at least one processor to carry out a method comprising:
obtaining, from a digital twin network, first data and a label corresponding to the first data;
obtaining, through training based on the first data and the label corresponding to the first data, an artificial intelligence (AI) model, wherein the AI model is configured to obtain an air interface access policy and/or a user plane path selection policy of a plurality of terminal devices in a network or in an area of interest, and
sending, by the network data analytics function network element to provide feedback for a data analysis result subscriber, second information that includes an air interface access policy list and/or a user plane path selection solution list of the plurality of terminal devices,
wherein the label is an access solution, and
wherein the first data comprises at least one historical information of the plurality of terminal devices in the network or in the area of interest, wherein the historical information is at least one of an information type taken from the group consisting of:
location information, service information, reference signal received power, RSRP, information, reference signal received quality, RSRQ, information, and signal to interference plus noise ratio (SINR) information.

17. A policy determining apparatus, comprising:
at least one processor; and
at least one memory, wherein the at least one memory is coupled to the at least one processor and stores programming instructions for execution by the at least one processor to carry out a method comprising:
obtaining an AI model according to a method comprising:
obtaining, from a digital twin network, first data and a label corresponding to the first data; and
obtaining, through training based on the first data and the label corresponding to the first data, an artificial intelligence (AI) model, wherein the AI model is configured to obtain an air interface access policy and/or a user plane path selection policy of a plurality of terminal devices in a network or in an area of interest;
obtaining third data, wherein the third data comprises current information of a plurality of terminal devices in a network or in an area of interest, wherein current information is an information type taken from the group consisting of:
location information, service information, reference signal received power (RSRP) information, reference signal received quality (RSRQ) information, and signal to interference plus noise ratio (SINR) information;
inputting the third data into the AI model; and
obtaining an air interface access policy and/or a user plane path selection policy of the plurality of terminal devices in the network or in the area of interest.

18. A non-transitory computer-readable storage medium, comprising instructions that, when executed by one or more processors of a network data analytics function network element, cause the one or more processors to perform operations comprising:
obtaining from a digital twin network, first data and a label corresponding to the first data; and
obtaining, through training based on the first data and the label corresponding to the first data, an artificial intelligence (AI) model, wherein the AI model is configured to obtain an air interface access policy and/or a user plane path selection policy of a plurality of terminal devices in a network or in an area of interest, and
sending, by the network data analytics function network element to provide feedback for a data analysis result subscriber, second information that includes an air interface access policy list and/or a user plane path selection solution list of the plurality of terminal devices,
wherein the label is an access solution, and
wherein the first data comprises at least one historical information of the plurality of terminal devices in the network or in the area of interest, wherein the historical information is at least one of an information type taken from the group consisting of:
location information, service information, reference signal received power, RSRP, information, reference signal received quality, RSRQ, information, and signal to interference plus noise ratio (SINR) information.

19. A non-transitory computer-readable storage medium comprising instructions which, when executed by one or more processors, cause the one or more processors to perform operations comprising:
 obtaining an AI model according to a method comprising:
  obtaining, from a digital twin network, first data and a label corresponding to the first data; and
  obtaining, through training based on the first data and the label corresponding to the first data, an artificial intelligence (AI) model, wherein the AI model is configured to obtain an air interface access policy and/or a user plane path selection policy of a plurality of terminal devices in a network or in an area of interest;
 obtaining third data, wherein the third data comprises current information of a plurality of terminal devices in a network or in an area of interest, wherein current information is an information type taken from the group consisting of:
  location information, service information, reference signal received power (RSRP) information, reference signal received quality (RSRQ) information, and signal to interference plus noise ratio (SINR) information;
 inputting the third data into the AI model; and
 obtaining an air interface access policy and/or a user plane path selection policy of the plurality of terminal devices in the network or in the area of interest.

* * * * *